(12) United States Patent
Cohen

(10) Patent No.: US 8,814,480 B2
(45) Date of Patent: Aug. 26, 2014

(54) CUTTING INSERT CHIP-CONTROL ARRANGEMENT

(75) Inventor: Benjamyn Cohen, Nahariya (IL)

(73) Assignee: Iscar, Ltd., Tefen (IL)

( * ) Notice: Subject to any disclaimer, the term of this patent is extended or adjusted under 35 U.S.C. 154(b) by 192 days.

(21) Appl. No.: 13/448,793

(22) Filed: Apr. 17, 2012

(65) Prior Publication Data

US 2013/0272808 A1 Oct. 17, 2013

(51) Int. Cl.
*B23C 5/20* (2006.01)
*B23B 27/22* (2006.01)

(52) U.S. Cl.
USPC .......................... 407/113; 407/114

(58) Field of Classification Search
USPC ................... 407/114, 115, 116, 113
See application file for complete search history.

(56) References Cited

U.S. PATENT DOCUMENTS

| | | | | |
|---|---|---|---|---|
| 5,044,840 A | * | 9/1991 | Fouquer et al. | 407/114 |
| 5,147,159 A | | 9/1992 | Lowe et al. | |
| 5,193,947 A | | 3/1993 | Bernadic et al. | |
| 5,372,463 A | * | 12/1994 | Takahashi et al. | 407/114 |
| 5,743,681 A | * | 4/1998 | Wiman et al. | 407/114 |
| 5,947,651 A | * | 9/1999 | Murakami et al. | 407/114 |
| 6,234,726 B1 | | 5/2001 | Okada et al. | |
| 7,621,700 B2 | * | 11/2009 | Jonsson et al. | 407/114 |
| 7,976,251 B2 | * | 7/2011 | Iyori et al. | 407/114 |
| 8,267,623 B2 | * | 9/2012 | Park et al. | 407/113 |
| 2005/0019111 A1 | | 1/2005 | Kitagawa et al. | |

FOREIGN PATENT DOCUMENTS

JP   2004 106150   4/2004

OTHER PUBLICATIONS

International Search Report dated May 9, 2013 issued in PCT counterpart application (No. PCT/IL2013/050267.
International Search Report dated Sep. 5, 2013 issued in PCT counterpart application (No. PCT/IL2013/050267.

* cited by examiner

*Primary Examiner* — Will Fridie, Jr.
(74) *Attorney, Agent, or Firm* — Womble Carlyle

(57) ABSTRACT

A cutting insert has a chip-control arrangement. The cutting insert includes opposing top and bottom ends and first and second side surfaces that extend therebetween and meet at a cutting corner having a bisector. The chip-control arrangement also includes an elongated surface extending in an upward direction from the top end face, and also extending longitudinally to opposing sides of the bisector. The elongated surface includes a first and second extremity. The first extremity is closer to the first side surface than to the bisector, and the second extremity is closer to the second side surface than to the bisector.

21 Claims, 3 Drawing Sheets

CUTTING INSERT CHIP-CONTROL ARRANGEMENT

FIELD OF THE INVENTION

The subject matter of the present application relates to a chip-control arrangement for a cutting insert. Such arrangement can be formed on an insert configured for, inter alia, turning operations. In particular, such arrangement can be formed on an insert configured for finish turning operations.

BACKGROUND OF THE INVENTION

Cutting inserts can be provided with a chip-control arrangement for controlling the flow of and/or controlling the shape and size of the swarf and debris resulting from metal-working operations.

Such chip-control arrangements usually consist of recesses and/or projections located near a cutting edge of the insert. Upon encountering the recesses and/or projections, metal chips can be created with specific shapes and can then be evacuated therefrom.

Various chip-control arrangements are disclosed in U.S. Pat. Nos. 5,147,159, 5,193,947, 5,743,681, 6,234,726 and US 2005/0019111A1.

SUMMARY OF THE INVENTION

In accordance with the subject matter of the present application there is provided a cutting insert comprising a cutting corner formed with a chip-control arrangement which comprises at least one elongated surface extending longitudinally to opposing sides of a cutting corner bisector.

For example, such cutting insert can comprise
  a cutting corner having a bisector and formed at an intersection of opposing top and bottom end faces and first and second side surfaces of the cutting insert, and
  a chip-control arrangement located at the cutting corner;
the chip-control arrangement comprising an elongated surface extending in an upward direction from the top end face, and also extending longitudinally to opposing sides of the bisector;
  the elongated surface comprising first and second extremities and an elongated middle portion extending therebetween;
  the first extremity being closer to the first side surface than to the bisector, and
  the second extremity being closer to the second side surface than to the bisector.

The chip-control arrangement has been found to be advantageous for turning cutting inserts, in particular for performing finishing operations. However such chip-control arrangements could possibly be advantageous for other types of operations, such as, for example, milling.

It is understood that the above-said is a summary, and that features described hereinafter may be applicable in any combination to the subject matter of the present application, for example, any of the following features may be applicable to the cutting insert or chip-control arrangement:
A. The elongated surface can extend longitudinally in a direction perpendicular to the bisector.
B. In a top view, the elongated surface can be concavely curved.
C. In a cross-sectional view taken perpendicular to a longitudinal extension of the elongated surface, the elongated surface can comprise an upwardly extending convex portion.
D. In a cross-sectional view taken along a longitudinal extension of the elongated surface, the elongated surface can comprise an upwardly extending convex portion.
E. The chip-control arrangement can be symmetrical about the bisector.
F. The chip-control arrangement can comprise a declining surface extending rearwardly from the elongated surface.
G. In a top view, the declining surface can comprise two curved portions.
H. In a top view, the periphery of the elongated surface and the declining surface can lie along three edges of an imaginary triangle.
I. The cutting insert can comprise a central island.
J. The central island can comprise a raised island upper surface surrounded by an island inclined surface.
K. The central island can comprise an elongated nose portion directed towards the cutting corner.
L. A ridge can extend from the nose portion in a direction towards the declining surface.
M. The ridge can overlap and divide the declining surface into two triangular portions connected by a neck portion.
N. The ridge can extend along the bisector.
O. The ridge can be symmetrical about the bisector.
P. The island inclined surface can comprise an elongated rib.
Q. The rib can extend from the ridge to the raised island upper surface.
R. The rib can extend along the bisector.
S. The rib can be symmetrical about the bisector.
T. In a cross-sectional view, the ridge and the rib form an obtuse exterior angle at the intersection thereof.
U. The rib can comprise a rib peak.
V. Relative to an upward direction, a lowermost central island point on the central island can be located higher than the rib peak.
W. The cutting insert can comprise a cutting edge formed at the intersection of the top end face and the first and second side surfaces respectively.
X. The first extremity can be closer to an associated portion of the cutting edge than to the bisector.
Y. The second extremity can be closer to an associated portion of the cutting edge than to the bisector.
Z. The middle portion can be spaced further rearward from the cutting corner than the first and second extremities.
AA. The cutting insert can comprise a first recess located between a land which extends along an intersection of the top end face and the first and second side surfaces, and the first extremity of the elongated surface, and a second recess located between the land and the second extremity of the elongated surface.
BB. The land can comprise a minimum land width adjacent at least one of the first and second recesses.
CC. The elongated surface can comprise an elongated surface uppermost area which, in relation to an upward direction, can be lower than a cutting edge point on the land.
DD. The cutting insert can comprise a chip deflecting surface extending between the land and the elongated surface.

BRIEF DESCRIPTION OF THE FIGURES

For a better understanding of the present application and to show how the same may be carried out in practice, reference will now be made to the accompanying drawings, in which.

Figure 1:
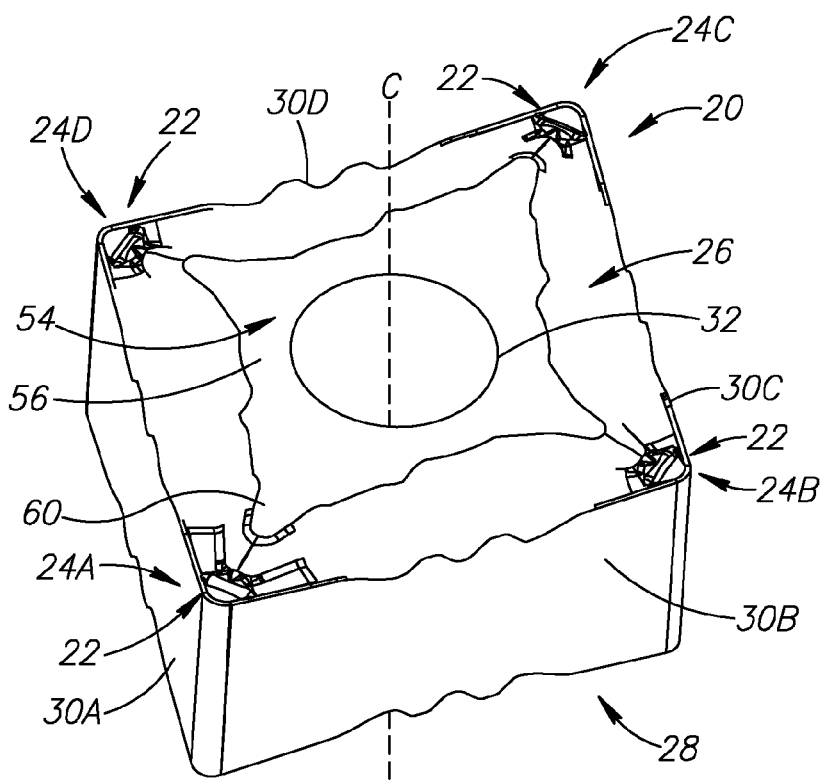
FIG. 1 is a perspective view of a cutting insert.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Figure 2:
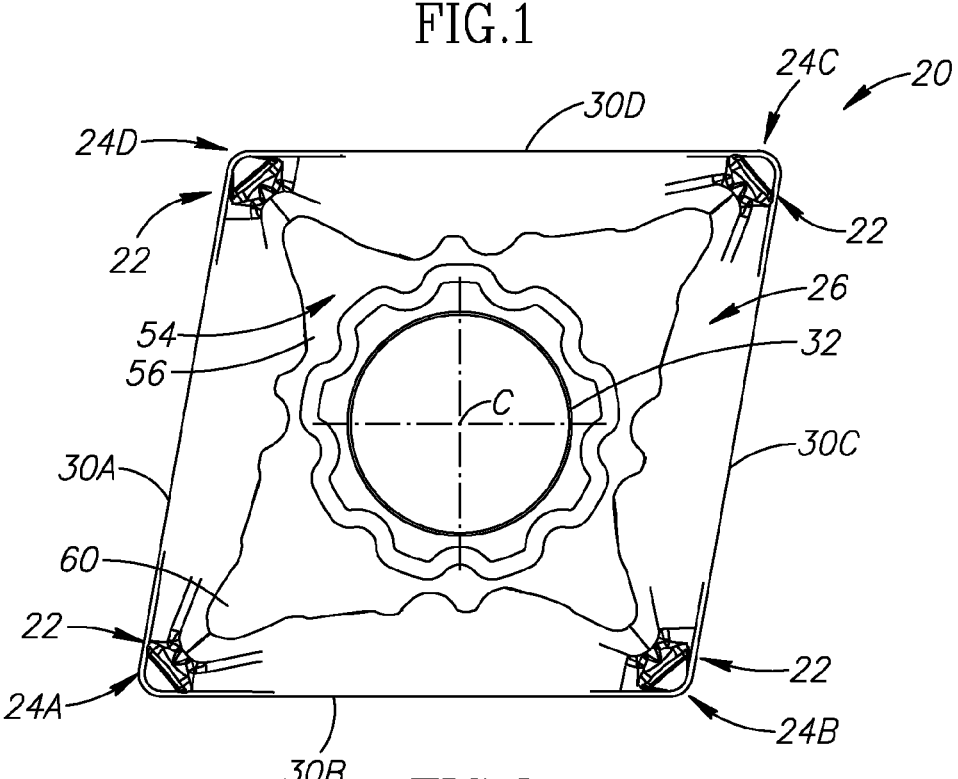
FIG. 2 is a top view of the cutting insert in FIG. 1.

Attention is first drawn to FIGS. 1 and 2, showing a cutting insert 20 with a chip-control arrangement 22. The chip-control arrangement 22 on the cutting insert 20 is suitable for finishing in, inter alia, turning, facing, and profiling operations. The chip-control arrangement 22 is suitable particularly for operations where a low depth of cut is required on the work piece. For example, the depth of cut can be typically less than approximately 4 mm. In theory, the chip-control arrangement 22 may be particularly suitable for using on work-pieces made of steel, but it is also suitable for using on work-pieces made of other materials.

Figure 5:
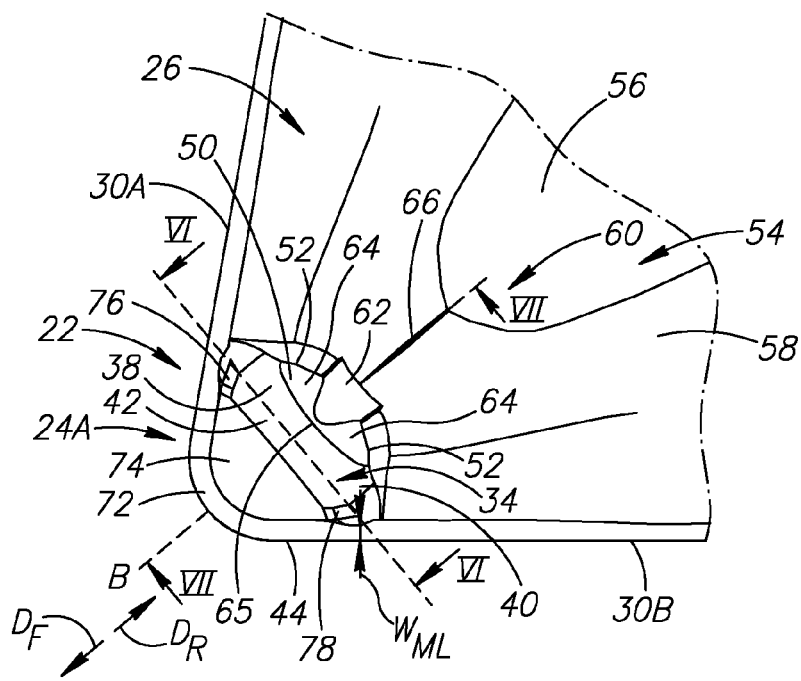
FIG. 5 is a further enlarged view of the cutting corner in FIG. 4.

The cutting insert 20 includes a cutting corner 24A having a bisector B. The bisector B defines forward and rearward directions $D_F$, $D_R$ (FIG. 5). It is understood from the figures that the forward direction $D_F$ is in an "outward" direction of the insert (away from the insert center), while the rearward direction $D_R$ is in an "inward" direction of the insert (towards the insert center).

The cutting corner 24 is formed at an intersection of opposing top and bottom end faces 26, 28 and first and second side surfaces 30A, 30B of the cutting insert 20.

In this non-limiting example, as shown in the top view of the top end face 26 in FIG. 1, the cutting insert 20 comprises first, second, third and fourth side surfaces 30A, 30B, 30C, 30D, which are connected at the cutting corner 24A, and additionally at second, third and fourth cutting corners, 24B, 24C, 24D. More precisely, in such a view, the side surfaces 30A, 30B, 30C, 30D form a parallelogram shape and, even more precisely, a rhomboid. It is understood, however, that the chip-control arrangement 22 described hereinafter could also be formed on cutting inserts comprising a different number of sides or, in such a view, other shapes comprising at least one cutting corner.

It is also noticed, that, in this non-limiting example, the cutting insert 20 is formed with a clamping hole 32 located in the middle thereof (FIG. 2) which opens out to the top and bottom end faces 26, 28 and is configured for receiving a clamping member (not shown) therethrough. It is understood that alternative methods of fastening an insert to an insert holder could be employed, for example clamping jaws, and therefore such inserts could be devoid of, or comprise a differently shaped, clamping hole.

Figure 3:
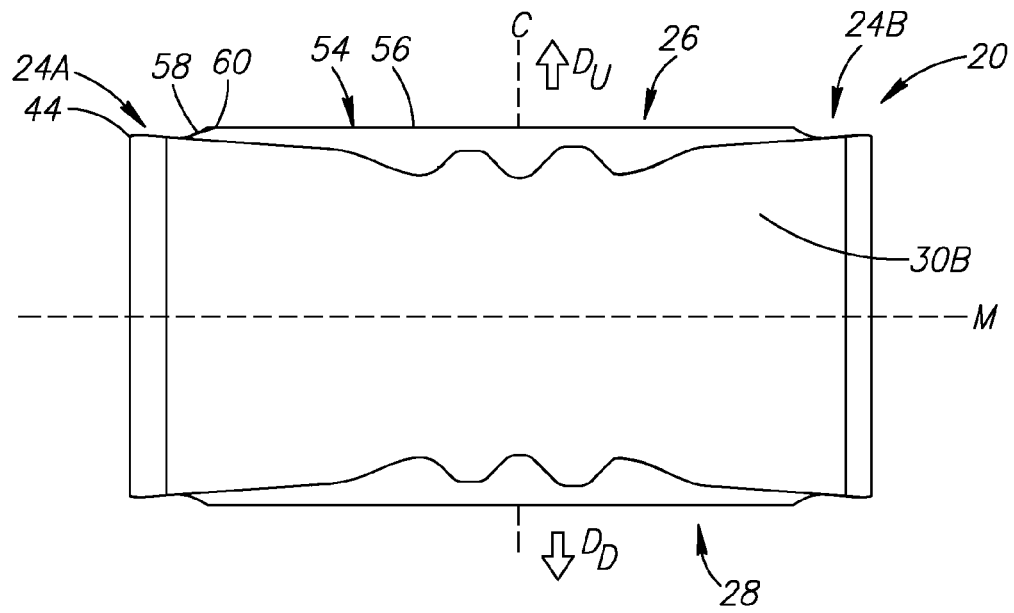
FIG. 3 is a side view of the cutting insert in FIGS. 1 and 2.

A central axis C extends through the top and bottom end faces 26, 28. In this non-limiting example, the central axis C is coaxial with the clamping hole 32, and each of the first, second, third and fourth side surfaces 30A, 30B, 30C, 30D can extend parallel to the central axis C. References made hereinafter to height are measurable in a direction parallel to the central axis C. Additionally, as shown in FIG. 3, the central axis C defines upward and downward directions $D_U$, $D_D$.

In this non-limiting example, the cutting insert 20 is double-sided with each of the eight corners thereof being formed with an identical chip-control arrangement 22. The top and bottom end faces 26, 28 can be mirror symmetrical about a plane of mirror symmetry M that is perpendicular to the central axis C and extends through the first and second side surfaces 30A, 30B. It is also understood that the cutting insert 20 in accordance with the subject matter of the present application could comprise one or more cutting corners with such chip-control arrangement 22 and other cutting corners which could be devoid of any chip-control arrangement or formed with a different chip-control arrangement.

Figure 4:
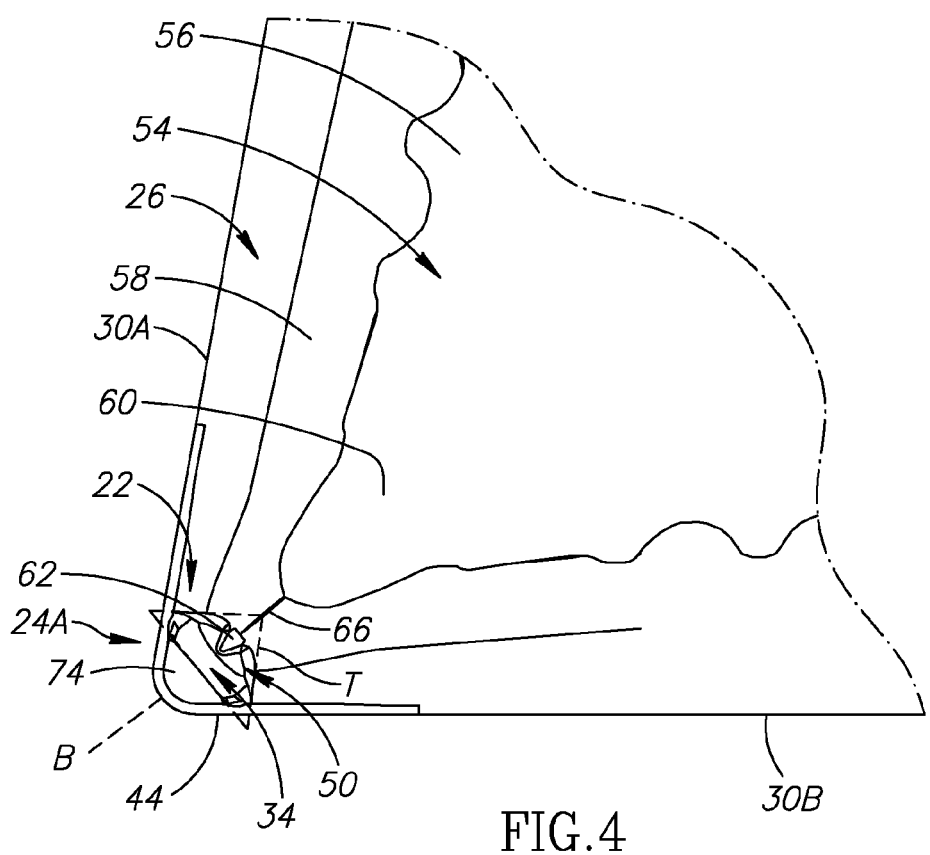
FIG. 4 is an enlarged view of a cutting corner of the cutting insert in FIGS. 1 to 3.
Figure 7:
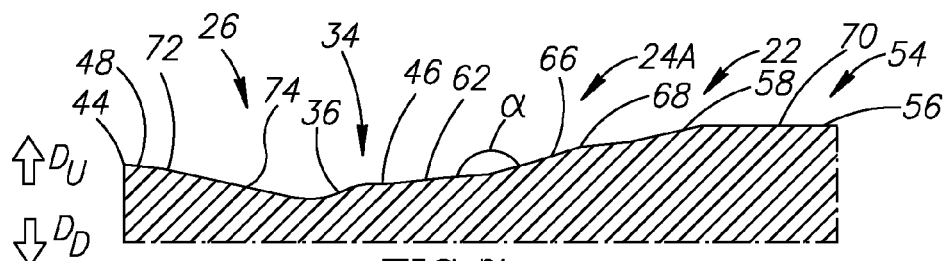
FIG. 7 is a cross section view taken along line VII-VII, which extends along a bisector B, in FIG. 5.

Referring now to the top view of the top end face 26 in FIGS. 4 and 5, the chip-control arrangement 22 is located at the cutting corner 24A and includes an elongated surface 34, which extends upwardly from the top end face 26, as perhaps best shown in FIG. 7. More precisely, the elongated surface 34 extends away from the cutting corner 24A. Additionally, the elongated surface 34 extends longitudinally to opposing sides of the bisector B. More precisely, the elongated surface 34 can extend longitudinally in a direction transverse to, and to opposing sides of, the bisector B. The design of the elongated surface 34 is configured for controlling or creating of chips with a size and shape that can be beneficial for their removal from the cutting area. It is noted, that, in this non-limiting example, the chip-control arrangement 22 comprises exactly one elongated surface 34.

In accordance with some embodiments of the subject matter of the present application, in a top view, the elongated surface 34 can extend longitudinally in a direction perpendicular to the bisector B. The elongated surface 34 can be symmetrical about the bisector B.

Figure 6:
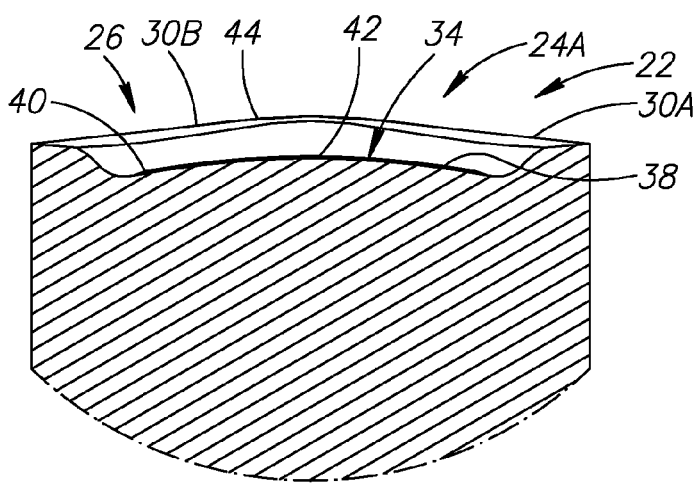
FIG. 6 is a cross section view taken along line VI-VI in FIG. 5.

Referring now to FIG. 7, further in accordance with some embodiments of the subject matter of the present application, in a cross-sectional view taken perpendicular to a longitudinal extension of the elongated surface 34, the elongated surface 34 comprises an upwardly extending convex portion 36. Moreover, referring now to FIG. 6, in a cross-sectional view taken along a longitudinal extension of the elongated surface 34, the elongated surface 34 comprises an upwardly extending convex portion 36.

The elongated surface 34 can comprise first and second extremities 38, 40 with an elongated middle portion 42 that extends therebetween. The extremities 38, 40 are the most spaced-apart regions or ends of the elongated surface 34. The elongated surface 34 can be concavely curved, in a top view. More precisely, drawing attention to FIG. 5, such curvature can result in the middle portion 42 being spaced further rearward from the cutting corner 24A, with reference to the rearward direction DR, than the first and second extremities 38, 40. A cutting edge 44 can be formed at the intersection of the top end face 26 and the first and second side surfaces 30A, 30B respectively. The first extremity 38 can be closer to an associated portion of the cutting edge 44 than to the bisector B. The second extremity 40 can be closer to an associated portion of the cutting edge 44 than to the bisector B. Stated differently, the first extremity 38 can be closer to the first side surface 30A than to the bisector B. Similarly, the second extremity 40 can be closer to the second side surface 30B than to the bisector B. The elongated surface 34 can further comprise an elongated surface uppermost area 46 which, in relation to an upward direction DU, can be lower than a cutting edge point 48 on a land 72 extending along an intersection of the top end face 26 and the first and second side surfaces 30A, 30B. The uppermost area 46 of the convex portion 36 of the elongated surface 34 corresponds to the location of the bisector B as understood in view of FIGS. 5 and 6.

In accordance with some embodiments of the subject matter of the present application the chip-control arrangement 22 can include a declining surface 50 that extends rearwardly from the elongated surface 34. In a top view, the declining surface 50 can include two curved portions 52. The two curved portions 52 can be identically shaped. Referring to FIG. 4, in a top view, the periphery of the elongated surface 34 and the declining surface 50 can lie along three edges of an imaginary triangle T. The imaginary triangle T can be symmetrical about the bisector B.

In accordance with some embodiments of the subject matter of the present application the cutting insert 20 can include a central island 54. The central island 54 can comprise a raised island upper surface 56 that can be surrounded by an island inclined surface 58. The central island 54 can comprise an elongated nose portion 60 directed towards the cutting corner 24A. The purpose of the raised island upper surface 56 is to provide a rigid surface for mounting the cutting insert 20 to a tool holder (not shown).

In accordance with some embodiments of the subject matter of the present application a ridge 62 can extend from the nose portion 60 in a direction towards the declining surface 50. The ridge 62 can be configured for breaking chips (not shown) produced via a metal working operation. The ridge 62 can overlap and divide the declining surface 50 into two triangular portions 64 connected by a neck portion 65. The ridge 62 can extend along the bisector B. The ridge 62 can be symmetrical about the bisector B. The island inclined surface 58 can comprise an elongated rib 66 that extends from the ridge 62 to the raised island upper surface 56. The rib 66 can be configured for breaking chips (not shown) produced a metal working operation. The rib 66 can extend along the bisector B.

In a longitudinal cross-sectional view the ridge 62 and the rib 66 can form an obtuse exterior angle α at the intersection thereof. Additionally, the rib 66 can include a rib peak 68. The rib can include two linear parts. In relation to an upward direction $D_U$, a lowermost central island point 70 on the central island 54 can be located higher than the rib peak 68.

The cutting insert 20 can include a land 72 that extends along an intersection of the top end face 26 and the first and second side surfaces 30A, 30B. The purpose of the land 72 is to strengthen the cutting edge 44. A chip deflecting surface 74 can extend between the land 72 and the elongated surface 34.

The cutting insert 20 can include a first recess 76 located between the land 72 and a first extremity 38 of the elongated surface 34 and a second recess 78 located between the land 72 and a second extremity 40 of the elongated surface 34. The land 72 can have a minimum land width $W_{ML}$ adjacent the first and/or second recesses 76, 78.

The chip-control arrangement 22 can be symmetrical about the bisector B. A possible advantage of symmetry about the bisector B, is that the cutting insert 20 can have equal chip-control qualities regardless of whether the cutting insert 20 is used in a left or right handed configuration.

It should be noted that a feature of subject matter of the present application is that the chip-control arrangement 22 produces chips having a shape and size beneficial for removal from the cutting area. This reduces the possibility of the cutting edge 44 of the cutting insert 20 being damaged by non-removal of chips.

Such application may be achievable with the above-described construction, even without additional features or constructions components.

Although the subject matter of the present application has been described to a certain degree of particularity, it should be understood that various alterations and modifications could be made without departing from the spirit or scope of the subject matter of the application as hereinafter claimed. For example, while example ranges, values and element-locations described above were found to be an advantageous configuration for turning inserts, particularly for finishing, other ranges, values and element-locations for different types of operations and/or workpiece materials are also feasible.

What is claimed is:

1. A cutting insert (20) comprising
a cutting corner (24A) having a bisector (B) and formed at an intersection of opposing top and bottom end faces (26, 28) and first and second side surfaces (30A, 30B) of the cutting insert (20),
a chip-control arrangement (22) located at the cutting corner (24A);
the chip-control arrangement comprising
an elongated surface (34) extending in an upward direction from the top end face (26), and also extending longitudinally to opposing sides of the bisector (B);
the elongated surface (34) comprising first and second extremities (38, 40) and an elongated middle portion (42) extending therebetween;
the first extremity (38) being closer to the first side surface (30A) than to the bisector (B), and
the second extremity (40) is closer to the second side surface (30B) than to the bisector (B),
wherein, in a cross-sectional view taken along a longitudinal extension of the elongated surface (34), the elongated surface (34) comprises an upwardly extending convex portion (36) with an uppermost area (46) corresponding with the bisector (B).

2. The cutting insert (20) according to claim 1, wherein, in a top view, the elongated surface (34) extends longitudinally in a direction perpendicular to the bisector (B).

3. The cutting insert (20) according to claim 1, wherein the elongated surface (34) is symmetrical about the bisector (B).

4. The cutting insert (20) according to claim 1, wherein, in a top view, the elongated surface (34) is concavely curved.

5. The cutting insert (20) according to claim 1, further comprising a cutting edge (44) formed at the intersection of the top end face (26) and the first and second side surfaces (30A, 30B) respectively; wherein
the first extremity (38) is closer to an associated portion of the cutting edge (44) than to the bisector (B); and
the second extremity (40) is closer to an associated portion of the cutting edge (44) than to the bisector (B).

6. The cutting insert (20) according to claim 1, wherein the chip-control arrangement (22) further comprises a declining surface (50) extending rearwardly from the elongated surface (34).

7. The cutting insert (20) according to claim 6, wherein in a top view, the periphery of the elongated surface (34) and the declining surface (50) lie along three edges of an imaginary triangle (T).

8. The cutting insert (20) according to claim 6, further comprising a central island (54) comprising:

a raised island upper surface (56) surrounded by an island inclined surface (58), the central island (54) having an elongated nose portion (60) directed towards the cutting corner (24A); and a ridge (62) extending from the nose portion (60) in a direction towards the declining surface (50).

9. The cutting insert (20) according to claim 8, wherein the ridge (62) overlaps and divides the declining surface (50) into two triangular portions (64) connected by a neck portion (65).

10. The cutting insert (20) according to claim 9, wherein the ridge (62) extends along the bisector (B).

11. The cutting insert (20) according to claim 8, wherein the island inclined surface (58) comprises an elongated rib (66) extending from the ridge (62) to the raised island upper surface (56), in a rearward direction of the insert.

12. The cutting insert (20) according to claim 11, wherein the rib (66) extends along the bisector (B).

13. The cutting insert (20) according to claim 12, wherein in a cross-sectional view, the ridge (62) and the rib (66) form an obtuse exterior angle (α) at the intersection thereof.

14. The cutting insert (20) according to claim 11, wherein the rib (66) comprises a rib peak (68) and, relative to an upward direction (DU), a lowermost central island point (70) on the central island (54) is located higher than the rib peak (68).

15. The cutting insert (20) according to claim 14, further comprising a first recess (76) located between a land (72), extending along an intersection of the top end face (26) and the first and second side surfaces (30A, 30B), and the first extremity (38) of the elongated surface (34), and a second recess (78) located between the land (72) and the second extremity (40) of the elongated surface (34).

16. The cutting insert (20) according to claim 15, wherein the land (72) has a minimum land width (WML) adjacent at least one of the first and second recesses (76, 78).

17. The cutting insert (20) according to claim 1, wherein, in a cross-sectional view taken perpendicular to a longitudinal extension of the elongated surface (34), the elongated surface (34) comprises an upwardly extending convex portion (36).

18. The cutting insert (20) according to claim 5, wherein the elongated surface (34) further comprises an elongated surface uppermost area (46) which, in relation to an upward direction (DU), is lower than a cutting edge point (48) on a land (72) extending along an intersection of the top end face (26) and the first and second side surfaces (30A, 30B).

19. The cutting insert (20) according to claim 1, wherein chip-control arrangement (22) is symmetrical about the bisector (B).

20. A cutting insert (20) comprising:
  a cutting corner (24A) having a bisector (B) and formed at an intersection of opposing top and bottom end faces (26, 28) and first and second side surfaces (30A, 30B) of the cutting insert (20);
  a chip-control arrangement (22) located at the cutting corner (24A);
  the chip-control arrangement comprising:
    an elongated surface (34) extending in an upward direction from the top end face (26), and also extending longitudinally to opposing sides of the bisector (B);
    the elongated surface (34) comprising first and second extremities (38, 40) and an elongated middle portion (42) extending therebetween;
    the first extremity (38) being closer to the first side surface (30A) than to the bisector (B), and
    the second extremity (40) is closer to the second side surface (30B) than to the bisector (B),
  wherein the chip-control arrangement (22) further comprises a declining surface (50) extending rearwardly from the elongated surface (34); and
  the cutting insert further comprising a central island (54) comprising:
    a raised island upper surface (56) surrounded by an island inclined surface (58), the central island (54) having an elongated nose portion (60) directed towards the cutting corner (24A); and
    a ridge (62) extending from the nose portion (60) in a direction towards the declining surface (50).

21. The cutting insert (20) according to claim 20, wherein the island inclined surface (58) comprises an elongated rib (66) extending from the ridge (62) to the raised island upper surface (56), in a rearward direction of the insert.

\* \* \* \* \*